Aug. 19, 1958     E. M. ÖSTERMAN     2,847,858
HYDRAULIC MEANS FOR MEASURING SMALL DIFFERENTIAL
PRESSURE AT HIGH STATIC PRESSURES
Filed Sept. 14, 1953     2 Sheets-Sheet 1
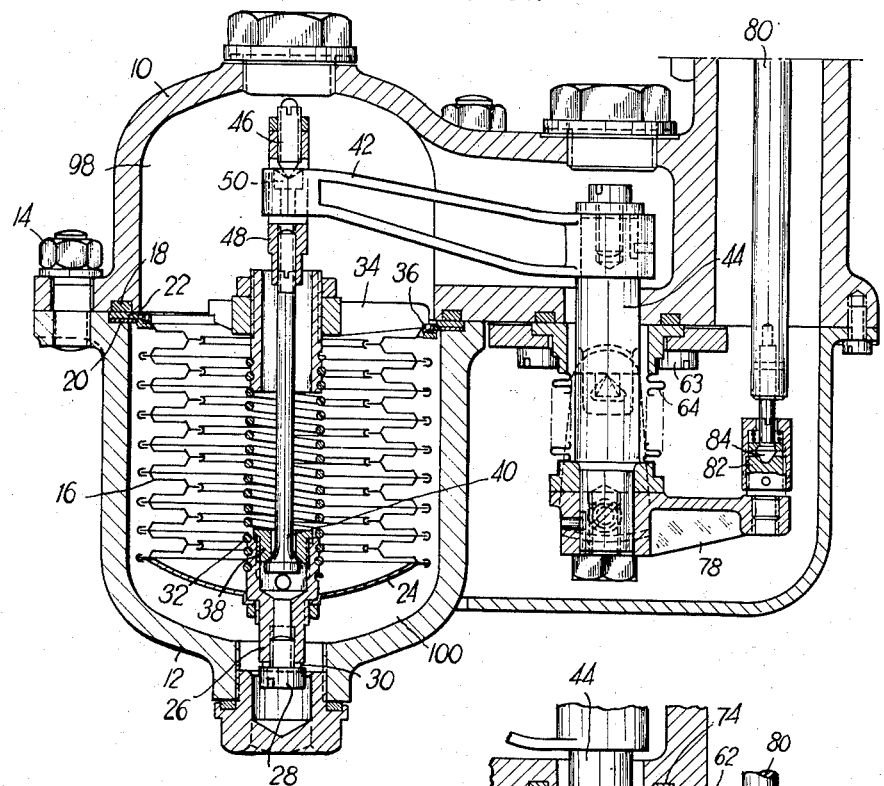
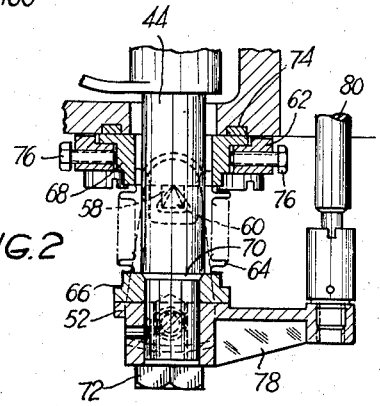
INVENTOR.
Edvin Mauritz Österman
BY
Pierce, Scheffler & Parker
His attorneys Aug. 19, 1958 E. M. ÖSTERMAN 2,847,858
HYDRAULIC MEANS FOR MEASURING SMALL DIFFERENTIAL
PRESSURE AT HIGH STATIC PRESSURES
Filed Sept. 14, 1953 2 Sheets-Sheet 2
FIG.4
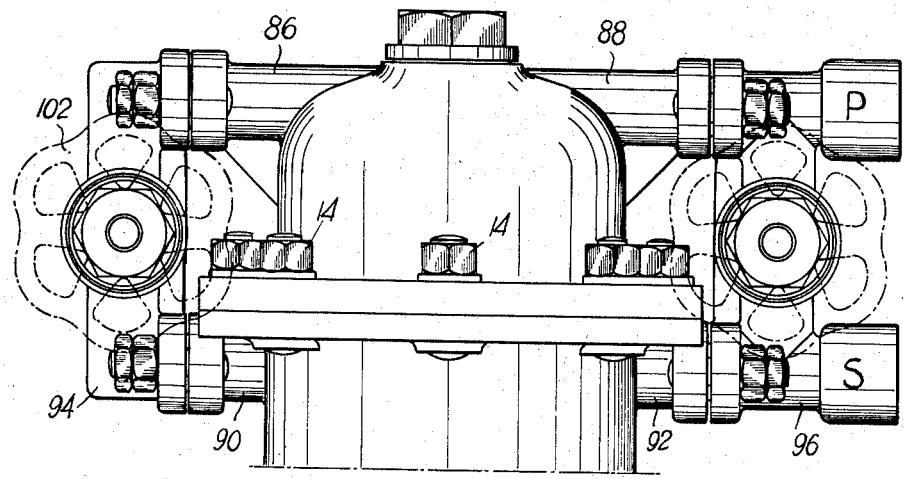
FIG.3
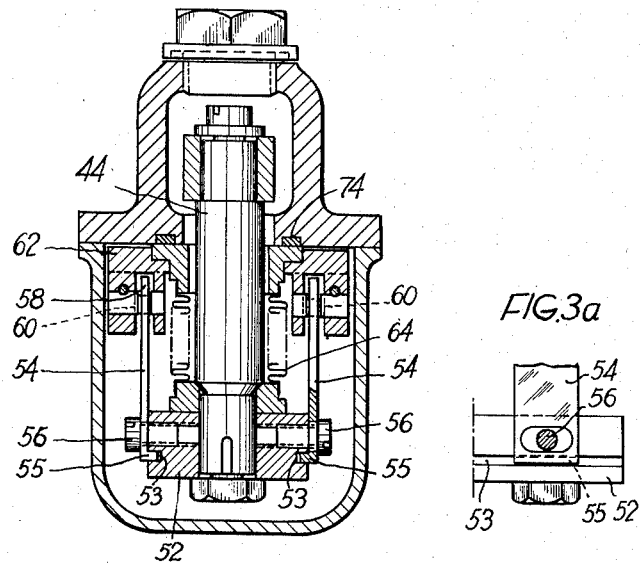
FIG.3a
Edvin Mauritz Österman
INVENTOR.
BY
Pierce, Scheffler & Parker
His attorneys

# United States Patent Office 2,847,858
Patented Aug. 19, 1958

2,847,858
HYDRAULIC MEANS FOR MEASURING SMALL DIFFERENTIAL PRESSURES AT HIGH STATIC PRESSURES

Edvin Mauritz Österman, Stockholm, Sweden, assignor to Svenska Ackumulator Aktiebolaget Jungner, Stockholm, Sweden, a corporation of Sweden Application September 14, 1953, Serial No. 379,970

Claims priority, application Sweden September 20, 1952

5 Claims. (Cl. 74—18.1)

The present invention refers to a contrivance having for its object to facilitate accurate measurements of small differential pressures at high static pressures. It is primarily intended to be used in pressure logs on submarines, but may also be made use of for instance in the measuring of currents in water power stations with high heads of water, for example. The contrivance in consideration is provided with a flexible wall, such as a bellows or a diaphragm, which is actuated on one side thereof by one pressure and on the other side thereof by a second pressure so as to be subjected to a varying force, and moves or undergoes an alteration of its shape, according as the difference between said two pressures, that is to say the differential pressure, varies. The movements of the flexible wall or the force acting thereon are transmitted to a measuring member which is only actuated by a low static pressure.

The transmission of the movement of the flexible wall or of the force acting thereon to the measuring or indicating member involves special difficulties, inasmuch as it will have to be performed with great accuracy, in order that the measurement shall become satisfactory, while also calling for special sealing means capable of providing an effective sealing effect between the space subjected to the high pressure, that is to say the high pressure side, and the space actuated by the low pressure, the low pressure side. The present invention has for its object, above all, to obviate these difficulties, and in particular to provide an exactly operating transmission from the flexible wall to the measuring member.

The invention is substantially distinguished by the feature that a lever is connected between the flexible wall and the measuring member for the transmission of forces or movements caused by variations in the differential pressure, said lever extending through a sealing bellows or a sealing diaphragm to provide a sealing effect between the high pressure side and the low pressure side, the axis of rotation of the lever intersecting the geometrical axis of the sealing bellows or being located in the proximity of the latter axis. As a result the accuracy of the measurements is improved and can be further improved by arranging the sealing bellows so to be adjustable to positions in which it does not cause any moment of torsion on the lever on account of the static pressure. The sealing bellows may thus be rotatably arranged so as to permit of being adjusted about its own geometrical axis into such a position that it will not tend to turn the lever. If the bearing of the lever is arranged on the low pressure side, the advantage is secured that this bearing becomes readily accessible for inspection and any necessary adjustment while being also protected against contact with the water on the high pressure side. The bearing is preferably constituted by a knife-edge bearing, which makes perfect precision possible in the transmission. The bearing of the lever may be displaceable in a direction at right angles to the mounting axis and to the axis of the sealing bellows, whereby a further possibility of adjustment is secured to avoid a disturbing influence of the sealing bellows on the lever.

If further members in addition to the lever are required for the transfer of the force from the flexible wall or for the transfer of the deflection thereof, it will be found suitable to form the connecting points with knife-edge or point bearings, whereby great accuracy will be obtained. The flexible wall is preferably enclosed within a pressure vessel, which is divided by the wall into two chambers, and these chambers should be provided with air valves located in the upper portion of the chambers, so that any air existing in the pressure vessel may conveniently escape when liquid is being filled into the pressure vessel.

An example of the application of the invention is illustrated in the accompanying drawings. The example of embodiment refers to a device for pressure logs for submarines, wherein the contrivance adapted to indicate the measurement, which may be of an arbitrary known construction, has been omitted. Fig. 1 shows a vertical section on an axial plane through the device. Fig. 2 shows an axial section of the tightening means and the motion transmitting means therethrough, and Fig. 3 shows the same device as Fig. 2, but in an axial section at right angles to that of Fig. 2. Fig. 3a is a detailed view of the means for effecting adjustability of the links of the knife-edge bearing. Fig. 4 shows the upper portion of the pressure vessel in a vertical projection viewed at right angles to Fig. 1.

In the example of embodiment shown in the drawing, the pressure vessel consists of an upper part 10 and a lower part 12, which are made from a relatively thick material to be capable of withstanding the high pressure. The outer edge of the flexible wall is clamped with a tightening fit between the parts 10, 12, which are kept together by means of bolts 14. This wall is shown here in the form of a bellows 16, which is denominated the differential pressure bellows. To provide for a sealing effect between the parts 10, 12 of the pressure vessel there are packings 18, 20 on either side of a border ring 22, to which the mouth border of the bellows proper is secured. At the bottom the bellows is closed by means of a cover 24 having a sleeve 26 extending centrally therethrough with a tight fit. The opening of the sleeve 26 is closed at the bottom by means of a screw 28 and a packing 30.

The bellows 16 is kept under a certain initial tension by means of a spring 32, the lower end of which is threaded fast onto the sleeve 26, and the upper end of which is connected to a support shown as a spider member 34 with three arms having the ends thereof resting on a supporting ring 36, which is in turn carried by the border ring 22. The spring 32 tends to contract the differential pressure bellows 16.

The differential pressure bellows 16 is connected, through the sleeve 26 and a thrust bearing ring 38 screw threaded into the same, as well as through a drawing-rod 40 cooperating therewith, with an arm 42 of the lever 44, by means of which the movements of the flexible wall are to be transferred out of the pressure vessel. The connection between the drawing-rod 40 and the arm 42 is mediated by a point bearing, the point of which is formed on a screw 46, which is secured to the drawing-rod 40 by means of a strap 48, while the seat 50 of the point bearing is arranged on the arm 42. The lever 44 is extended with a sealing fit through the wall of the pressure vessel, and is carried by said wall by means of knife-edge bearings.

The mounting of the lever 44 is shown in detail in Figs. 2 and 3. As will appear from said figures, the lower end of the lever has a ring 52 secured thereto, said ring constituting an attachment for a pair of links 54 retained on the ring by means of screws 56 and formed at the top into seats 58 resting on knife-edges 60. Two such links and knife-edges are arranged in diametrically opposed positions relatively to the rod 44. The knife-edges 60 are secured in a bearing ring 62 bolted to the pressure vessel by means of screw-threaded bolts 63.

For the sealing fit about the lever 44 there is provided a sealing bellows 64 about the same, and this bellows has its ends soldered with a sealing fit to a lower sealing ring 66 and an upper sealing ring 68. The lower sealing ring is pressed with a sealing fit against a conical shoulder 70 on the rod 44 by means of the ring 52, which is in turn pressed upwardly by means of a screw 72. The upper sealing ring 68 is pressed upwardly by the bearing ring 62 against the wall of the pressure vessel, and a sealing effect is obtained here by means of a packing 74.

As will be seen from Fig. 2, the sealing ring 68 is fitted with a certain degree of play into the bearing ring 62 so as to permit displacement in a direction at right angles to the axis of rotation defined by the knife-edge bearing and at right angles to the axis of the sealing bellows 64. This displacement may be effected by means of screws 76 threaded into the bearing ring 62 at diametrically opposed points. Furthermore, the sealing bellows 64 may be turned about the rod 44 together with the sealing rings 66, 68 so as to permit adjustment into such a position that it will not cause any moment of torsion on the rod 44 with respect to the axis of the knife-edge bearings 60.

It is of importance that the mounting of the lever 44 at the point of its passage through the wall of the pressure vessel be so constructed that the pressure in the pressure vessel does not cause any moment of torsion on the lever at said point. By the fact that the sealing ring 66 is displaceable and pivoted, and by the links 54 of the knife-edge bearing being made adjustable, such adjusting facilities are obtained that no such moment of torsion can manifest itself. The adjustability of the links 54 may be obtained by making the holes in the same for the screws sufficiently large to permit a displacement, and the requisite guidance may be obtained by projections 55 on the links, which projections are adapted displaceably to engage edge grooves 53 in the ring 52.

The securing ring 52 is preferably formed on an arm 78, by means of which the movements of the lever 44 are transmitted to a rod 80 adapted to be connected to the contrivance provided to indicate the value of the measurement. The free end of the arm 78 is provided with a seat 82, and the lower end of the rod 80 is provided with a point 84 in a point bearing mediating the connection between the arm and the rod.

As shown in Fig. 4, the upper part 10 of the pressure vessel is provided at the top with two sockets 86, 88, while the lower part 12 of the pressure vessel is provided with two sockets 90, 92. The sockets 86 and 90 are coupled to a valve 94, and the sockets 88, 92 are coupled to a valve 96. The sockets 86, 88 lead to the chamber 98 above the bellows 16, and the sockets 90, 92 lead to the chamber 100 below the same. The upper chamber 98 is intended to be under a variable Pitot tube pressure, and the lower chamber 100 is intended to be under the high static pressure. Liquid under the pressure of the Pitot tube is introduced through the socket 88, and liquid under the high static pressure is introduced through the socket 92. The sockets 86, 90 facilitate venting of the chambers 98, 100. The valve 94, which is provided with a hand-wheel 102, is constructed so as to open and close both chambers 98, 100 to the exterior at the same time, whereby the creation of any great difference in pressure within the pressure vessel, which would be disastrous to the differential pressure bellows, is prevented. The valve 96, which is provided with a hand wheel 104, is constructed so as to be able to bring the two chambers 98, 100 into communication with each other, so that they will be brought under equal pressures, it being thus possible to control and, if required to adjust the zero-point of the measuring device.

Instead of moving the links 54, or, in addition to these adjusting facilities, one may also arrange the knife-edges 60 to be displaceable in the same direction.

When the measuring device is in function, the end wall or cover 24 of the differential pressure bellows 16 moves up and down, according as the differential pressure on the bellows varies. The movement is transmitted to the drawing-rod 40 adapted to swing the lever formed by the arms 42 and 78 and the rod 44 about the knife-edge bearing. The arm 78 in turn moves the rod 80 up and down, and this movement is then indicated by the actual measuring member in known manner.

If the measuring device is constructed according to the servoprinciple, in a manner such as to return the rod 80 to the zero-position, and the power required therefor is measured, the cover 24 and the transmission means will obviously also return to or remain in their zero-position, and will only transmit torque.

What I claim is:

1. In a differential pressure responsive device having a high pressure vessel with a wall opening and a pressure sensitive member within said vessel exposed to the differential pressure, means for transmitting variations in position of said pressure sensitive member from within the pressure chamber to an external region of relatively low pressure comprising a lever connected to said pressure sensitive member and extending through said wall opening, pivot means pivotally connecting said lever to said vessel within said opening, and sealing bellows around said lever to seal said opening, said bellows being secured at one end to said vessel circumferentially about said opening and at the other end to said lever, said pivot means comprising a link ring secured to the end of said lever external of the vessel, a pair of links the lower ends of which are secured to said ring on opposite sides thereof, a bearing ring secured to said vessel circumferentially about said opening, and knife-edges on said bearing ring substantially in the plane of attachment of said bellows to said vessel, said knife-edges supporting the upper ends of said links on opposite sides of said opening, and means for adjustably displacing the end of the bellows attached to the vessel solely in the plane of attachment relative to said pivot bearing ring to a position in which no torsional movement due to the pressure difference on the sealing bellows is transmitted to the lever.

2. A differential pressure responsive device as defined in claim 1 wherein the pivot bearing ring is displaceable in a direction at right angles to the bearing axis and at right angles to the axis of the sealing bellows.

3. A differential pressure responsive device as defined in claim 2 wherein said links are adjustably connected to said link ring so that the angular relationship between said links and said lever may be varied.

4. In a differential pressure responsive device having a high pressure vessel with a wall opening and a pressure sensitive member within said vessel exposed to the differential pressure, means for transmitting variations in position of said pressure sensitive member from within the pressure chamber to an external region of relatively low pressure comprising a lever connected to said pressure sensitive member and extending through said wall opening, and pivot means adjacent said vessel opening pivotally connecting said lever to said vessel within said opening; sealing bellows around said lever for sealing said opening, said bellows being secured at one end to said lever and having a sealing ring at the other end thereof contiguous with the vessel wall circumferentially about said opening; a bearing ring coaxially surrounding said sealing ring, said bearing ring being secured to said vessel to press said sealing ring axially against the wall of said vessel; and radially inwardly directed screw means supported in said bearing ring for laterally displacing said sealing ring within said bearing ring relative to said pivot means to a position in which no torsional movement due to the pressure difference on the sealing bellows is transmitted to the lever.

5. A differential pressure responsive device as defined in claim 4 wherein said pivot means includes knife edge bearings and wherein said sealing ring is rotatably mounted relative to the bearing member.

References Cited in the file of this patent

UNITED STATES PATENTS

| | | |
|---|---|---|
| 2,217,537 | Carlstedt | Oct. 8, 1940 |
| 2,347,830 | Kiburz et al. | May 2, 1944 |
| 2,453,324 | Jones et al. | Nov. 9, 1948 |

FOREIGN PATENTS

| | | |
|---|---|---|
| 15,937 | Great Britain | Nov. 11, 1915 |
| 442,293 | Germany | Mar. 28, 1927 |
| 537,648 | Germany | Nov. 14, 1931 |
| 271,034 | Switzerland | Jan. 3, 1951 |